(12) United States Patent
Chuang

(10) Patent No.: US 8,467,043 B2
(45) Date of Patent: Jun. 18, 2013

(54) LENS MODULE TESTING APPARATUS

(75) Inventor: Hsin-Hung Chuang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 390 days.

(21) Appl. No.: 12/904,168

(22) Filed: Oct. 14, 2010

(65) Prior Publication Data

US 2012/0092652 A1      Apr. 19, 2012

(51) Int. Cl.
*G01B 9/00* (2006.01)

(52) U.S. Cl.
USPC .......................................... 356/124; 356/127

(58) Field of Classification Search
USPC ..... 356/124–127, 237.1–241.6, 242.1–243.8, 356/426–431, 600–640, 399–401
See application file for complete search history.

(56) References Cited

U.S. PATENT DOCUMENTS

| | | | |
|---|---|---|---|
| 3,485,561 A * | 12/1969 | Ewald | 356/154 |
| 3,657,792 A * | 4/1972 | Hug et al. | 29/407.05 |
| 3,792,930 A * | 2/1974 | Obenreder | 356/445 |
| 4,283,145 A * | 8/1981 | Miyazawa | 356/364 |
| 4,502,785 A * | 3/1985 | Truax | 356/608 |
| 4,673,817 A * | 6/1987 | Oomen | 250/559.23 |
| 4,690,556 A * | 9/1987 | Walker | 356/141.3 |
| 5,026,998 A * | 6/1991 | Holzl | 250/559.37 |
| 5,027,028 A * | 6/1991 | Skipper | 310/328 |
| 5,305,081 A * | 4/1994 | Gooch et al. | 356/428 |
| 5,329,121 A * | 7/1994 | Leviton | 250/231.13 |
| 6,415,109 B1 * | 7/2002 | Takase et al. | 396/378 |
| 6,678,059 B2 * | 1/2004 | Cho et al. | 356/614 |
| 6,853,507 B2 * | 2/2005 | Ryu et al. | 359/824 |
| 7,933,008 B2 * | 4/2011 | Marcu | 356/152.1 |

FOREIGN PATENT DOCUMENTS

CN      2919188 Y      7/2007

* cited by examiner

*Primary Examiner* — Gregory J Toatley
*Assistant Examiner* — Jarreas C Underwood
(74) *Attorney, Agent, or Firm* — Altis Law Group, Inc.

(57) ABSTRACT

An apparatus for testing a lens module includes a light source, a recording element, and an analyzing device. The lens module includes an actuator and a barrel. The light source emits a light beam towards the barrel. The light beam is reflected by the barrel and forms a light spot on the recording element. The recording element records a position of the light spot. The analyzing device calculates a distance between the position of the light spot and a reference position, compares the distance with a predetermined value, and determines whether the distance is larger than the predetermined value. If the distance is less than or equal to the predetermined value, the analyzing device determines that the lens module is satisfactory. If the distance is larger than the predetermined value, the analyzing device determines that the lens module is unsatisfactory.

13 Claims, 2 Drawing Sheets

LENS MODULE TESTING APPARATUS

BACKGROUND

1. Technical Field

The present disclosure relates to an apparatus for testing lens modules.

2. Description of Related Art

A typical lens module includes a barrel with lenses received in the barrel, a voice coil motor driver for accommodation of the barrel. The voice coil motor driver drives the barrel to move for achieving auto-focus.

After the barrel is assembled in the voice coil motor driver, the barrel may tilt relative to the voice coil motor driver. That is, an included angle between a central axis of the barrel and a central axis of the voice coil motor driver may be larger than zero. If the included angle is larger than a predetermined value, the lens module may be unsatisfactory. However, it is difficult to measure the included angle and determine whether the lens module is unsatisfactory.

Therefore, it is desirable to provide an apparatus, which can overcome the above-mentioned limitations.

DETAILED DESCRIPTION

Figure 1:
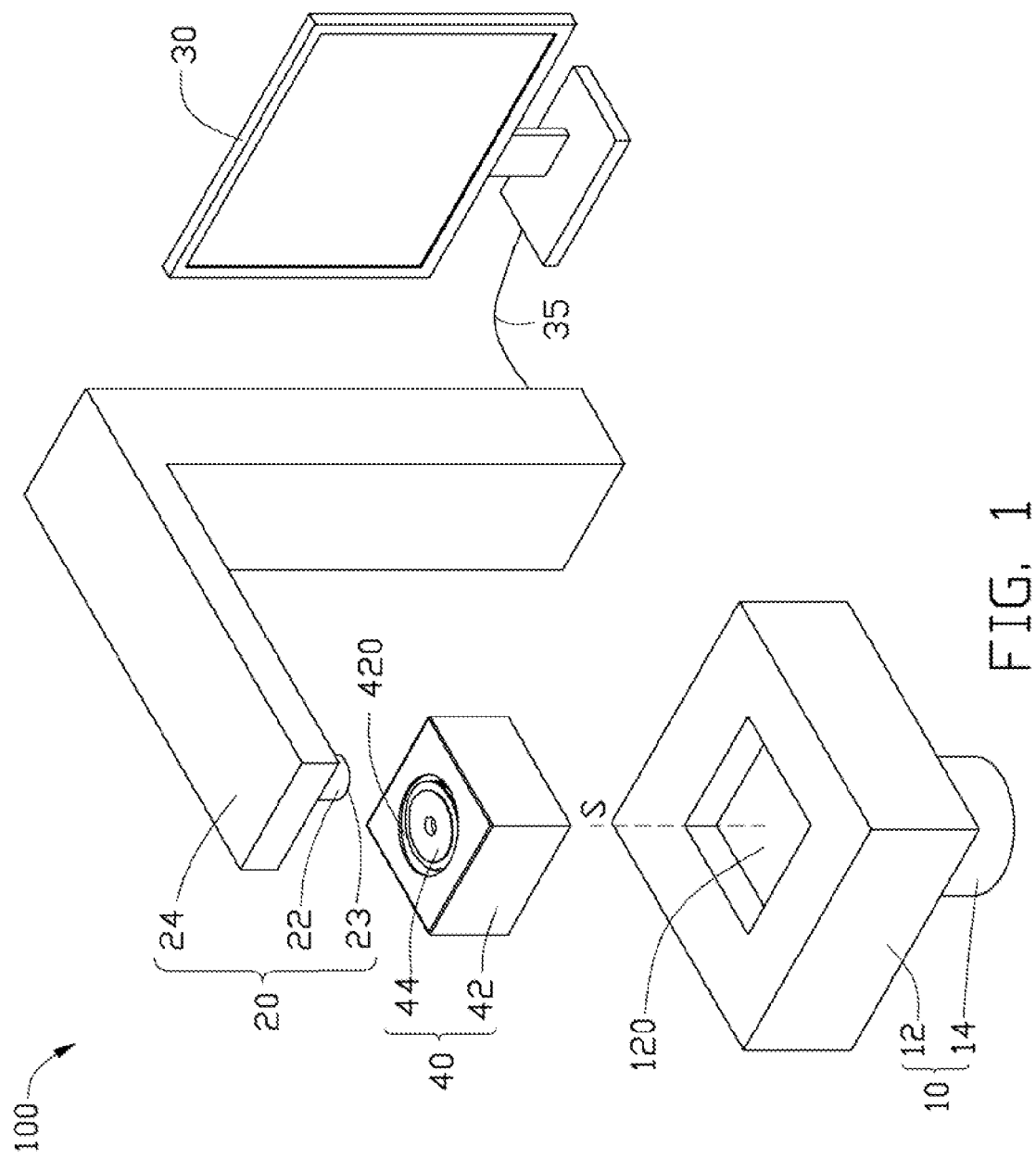
FIG. 1 is an isometric view of an apparatus for testing a lens module and the lens module according to an exemplary embodiment.
Figure 2:
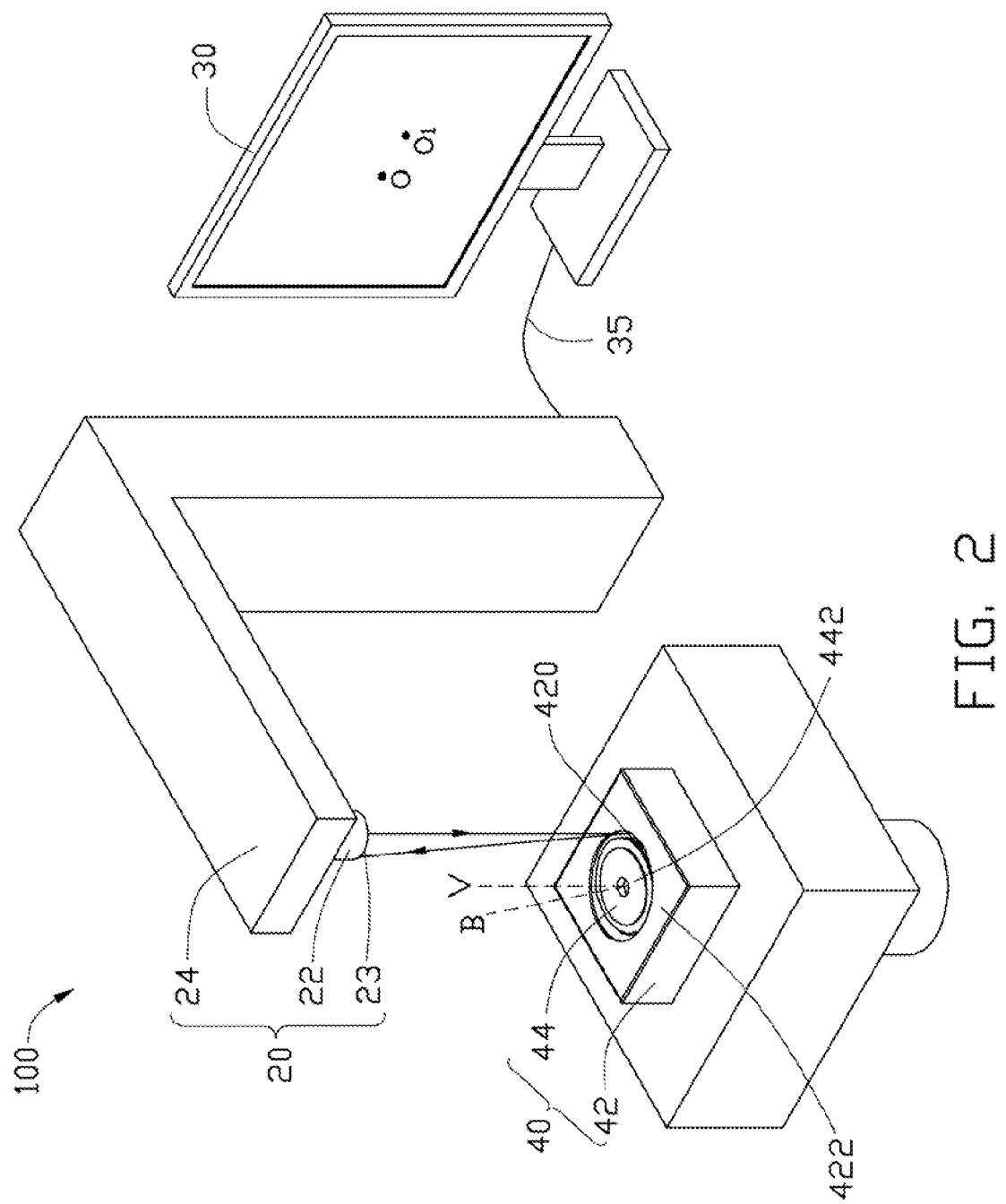
FIG. 2 is an isometric view of the apparatus of FIG. 1 in use.

Referring to FIGS. 1-2, an apparatus 100 for testing a lens module 40 is shown.

The lens module 40 includes a voice coil motor driver 42 and a barrel 44. The voice coil motor driver 42 includes a carriage 420, a top surface 422, and a central axis V. The central axis V is substantially perpendicular to the top surface 422. The barrel 44 is received in the carriage 420. The barrel 44 has a central axis B. The lens module 40 further includes lenses (not shown) accommodated in the barrel 44. The optical axis of the lens module 40 is substantially aligned with the central axis B of the barrel 44. In the present embodiment, an included angle between the central axes V and B is larger than zero.

The apparatus 100 includes a support device 10, a light source device 20, and an analyzing device 30. The apparatus 100 is configured (i.e., structured and arranged) for determining whether the included angle between the central axes V and B is within an acceptable range.

The support device 10 includes a support base 12, and an actuator 14. The support base 12 defines a substantially square recess 120 for accommodating the lens module 40. The recess 120 has a central axis S. The actuator 14 drives the support base 12 to rotate around the central axis S. When the lens module 40 is received in the recess 120, the central axis V of the voice coil motor driver 42 aligns with the central axis S of the recess 120. In other embodiments, the recess 120 may be other shapes depending on the shape of to-be-tested lens modules. In the present embodiment, the actuator 14 may be a motor.

The light source device 20 includes a light source 22, a recording element 23, and a support arm 24. The recording element 23 and the light source 22 are on one side of the support arm 24 facing the support device 10. In the present embodiment, the light source 22 is a laser. The light source 22 emits a laser beam substantially parallel to the central axis V of the voice coil motor driver 42 towards the lens module 44. The recording element 23 is adjacent to the light source 22. The recording element 23 is for recording a position of a light spot formed thereon, which is formed by a laser beam emitted by the light source 22 and reflected by the lens module 40. The recording element 23 is a photosensitive element, such as a charge coupled device (CCD) image sensor, or a complementary metal-oxide-semiconductor transistor (CMOS) image sensor. The support arm 24 is L-shaped.

The analyzing device 30 is electrically connected with the recording element 23 by a wire 35. In the present embodiment, the analyzing device 30 is a computer. The analyzing device 30 is configured for calculating a distance between the position of the light spot and a reference position, comparing the distance with a predetermined value, determining whether the distance is less than the predetermined value, and accordingly, determining whether the lens module 40 is satisfactory.

In use, the reference position O is set in the recording element 23 beforehand. The reference position O is a geometric center of a light emitting surface of the light source 22.

Then, the light source 22 emits a laser beam towards a gap between the barrel 44 and the carriage 420 of the voice coil motor driver 42. The laser beam is reflected by the outer surface of the barrel 44 to the recording element 23. The laser beam forms a light spot on the recording element 23, and the recording element 23 stores the position O1 of the light spot.

The analyzing device 30 calculates a distance between the reference position O and the position O1, and compares the distance with a predetermined value. If the distance is less than or equal to the predetermined value (i.e., an included angle between the central axis B of the barrel 44 and the central axis V of the voice coil motor driver 42 is within the acceptable range), the analyzing device 30 determines that the lens module 40 is satisfactory. If the distance is larger than the predetermined value (i.e., the included angle between the central axis B of the barrel 44 and the central axis V of the voice coil motor driver 42 is beyond the acceptable range), the analyzing device 30 determines that the lens module 40 is unsatisfactory. In the present embodiment, the predetermined value is 0.2 millimeters.

To test the lens module 40 more accurately, the actuator 14 drives the support base 12 to rotate around the central axis V of the voice coil motor driver 42, and the light source 22 emits laser beams toward different positions of the lens barrel 44. The recording element 23 records different positions of light spots reflected by the lens barrel 44. The analyzing device 30 calculates a distance between the reference position O and each position of each light spot, and compares the distance with the predetermined value. If the distance is less than the predetermined value, the analyzing device 30 determines that the lens module 40 is satisfactory. If the distance is larger than the predetermined value, the analyzing device 30 determines that the lens module 40 is unsatisfactory.

In other embodiments, the light source 22 may emit a laser beam towards the top surface 442 of the barrel 44. The laser beam is then reflected by the top surface 442 of the barrel 44, thus forming a light spot on the recording element 23.

In alternative embodiments, the voice coil motor driver 42 may be other actuators, for example, a piezoelectric motor.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. An apparatus for testing a lens module, the lens module comprising a first actuator and a barrel received in the first actuator, the apparatus comprising:
   a light source configured for emitting a light beam towards the barrel;
   a recording element, the light beam being reflected by the barrel and forming a light spot on the recording element, the recording element being configured for recording a position of the light spot; and
   an analyzing device being configured for calculating a distance between the position of the light spot and a reference position, comparing the distance with a predetermined value, and determining whether the distance is larger than the predetermined value, wherein if the distance is less than or equal to the predetermined value, the analyzing device determines that an included angle between a central axis of the barrel and a central axis of the first actuator is within an acceptable range; if the distance is larger than the predetermined value, the analyzing device determines that the included angled between the central axis of the barrel and the central axis of the first actuator is beyond the acceptable range.

2. The apparatus of claim 1, further comprising a supporting arm, wherein the light source and the recording element are mounted on one side of the supporting arm facing the lens module.

3. The apparatus of claim 2, wherein the recording element is adjacent to the light source.

4. The apparatus of claim 2, wherein the supporting arm is L-shaped.

5. The apparatus of claim 1, wherein the recording element comprises a photosensitive element.

6. The apparatus of claim 5, wherein the photosensitive device is selected from the group consisting of a CCD image sensor and a CMOS image sensor.

7. The apparatus of claim 1, wherein the analyzing device is electrically connected with the recording element.

8. The apparatus of claim 1, further comprising a supporting base, wherein the supporting base has a recess defined therein, and the recess is configured for accommodating the lens module.

9. The apparatus of claim 8, further comprising a second actuator, wherein the recess has a central axis, and the second actuator is configured for driving the supporting base to rotate around the central axis of the recess.

10. The apparatus of claim 9, wherein the second actuator comprises a motor.

11. The apparatus of claim 1, wherein the light source is a laser.

12. The apparatus of claim 1, wherein the first actuator is selected from the group consisting of a voice coil motor driver and a piezoelectric motor.

13. The apparatus of claim 1, wherein the light beam is parallel with the central axis of the first actuator.

* * * * *